(No Model.)
J. R. HOIT.
SLED BRAKE.
No. 376,197. Patented Jan. 10, 1888.
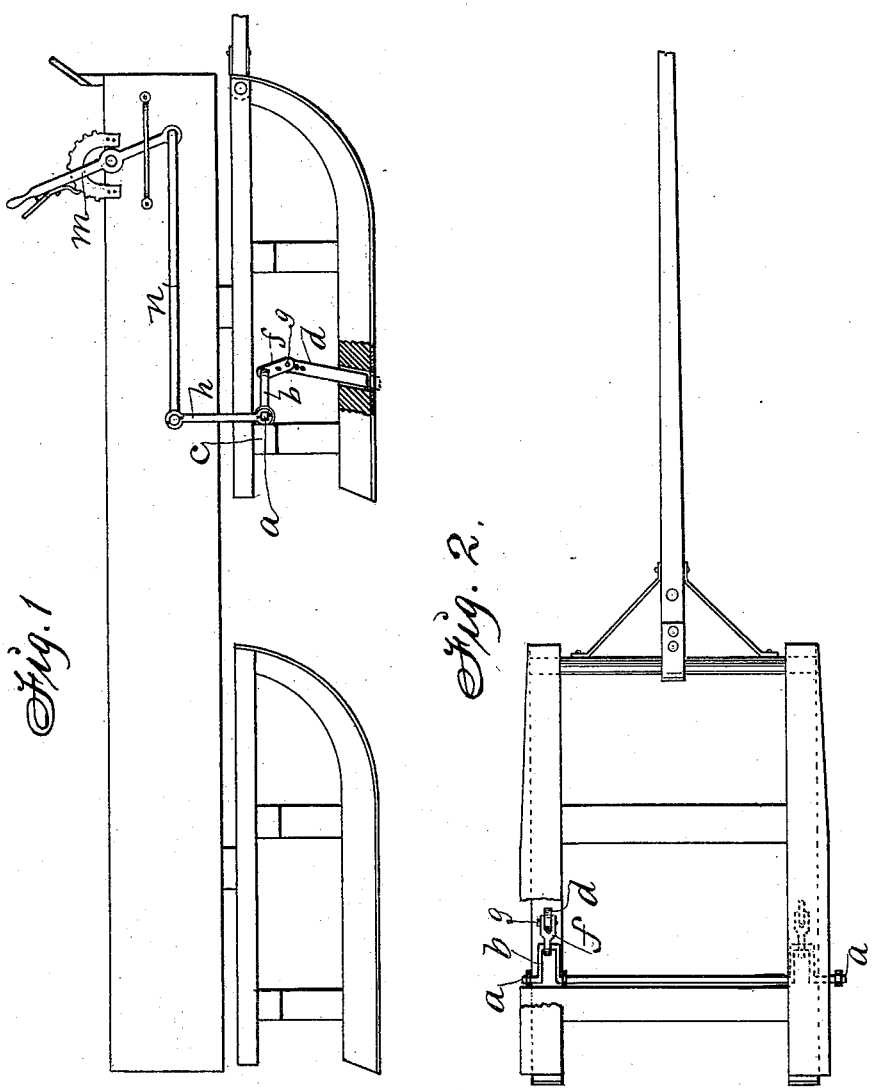
Witnesses:
R. H. Orwig.
Cu. Stiles.
Inventor:
Jacob R. Hoit,
By Thomas G. Orwig, Atty.

United States Patent Office.

JACOB R. HOIT, OF FOREST HOME, IOWA.

SLED-BRAKE.

SPECIFICATION forming part of Letters Patent No. 376,197, dated January 10, 1888.

Application filed March 7, 1887. Serial No. 230,008. (No model.)

*To all whom it may concern:*

Be it known that I, JACOB R. HOIT, a citizen of the United States of America, and a resident of Forest Home, in the county of Poweshiek and State of Iowa, have invented an Improved Brake for Sleds, of which the following is a specification.

My object is to prevent the dangers and accidents incident to loaded sleds slipping backward on upgrades and slipping forward and crowding horses on downgrades.

My invention consists in the construction and combination of detachable and adjustable self-sharpening brake-bars and a rock-shaft having lateral bends, with a sled and box and levers, as hereinafter set forth, pointed out in my claim, and illustrated in the accompanying drawings, in which—

Figure 1 is a side view of a complete sled having my brake device attached and part of one of the runners broken away to disclose the mortise through which the brake-bar is operated. Fig. 2 is a top view of one of the bobs to which my device is applied.

$a$ is a rock-shaft that has lateral bends $b$ near its ends. It is mounted in bearings fixed to any bench of the sleds in such a manner that it will extend parallel with the cross-piece $c$ of the bench.

$d\ d$ are brake-bars, preferably made of steel, detachably and adjustably connected with the bends or loops $b$ of the rock-shaft by means of knuckles $f$, in such a manner as to produce knuckle-joints. Perforations in the bifurcated lower ends of the knuckles and the top ends of the brake-bars, as shown in Fig. 1, allow the connecting-bolt $g$ to be shifted, as required, to elevate or lower the brake-bar relative to the rock-shaft and sled-runner. Mortises in the runners allow the brake-bars to be projected down through the runners to scrape the surface of the road and to arrest the motion of the sled or regulate its speed in advancing.

$h$ is an arm fixed to the end of the rock-shaft to produce a duplex elbow-shaped lever.

$m$ is a lever of the first order pivoted to a box on the sled in a common way.

$n$ is a rod connecting the short arm of the lever $m$ with the long arm $h$ of the duplex elbow-shaped lever to produce a compound lever for operating the brake-bars $d$ whenever desired. By pulling the long arm of the lever $m$ forward power and motion will be transmitted and the power multiplied, to thrust the brake-bars downward through the runners and the ice or surface of the ground, as required, to check or stop the advance of the sled. A reverse motion of the same levers elevates the brake-bars.

As the brake-bars are inclined, their lower ends will wear off obliquely to produce sharp corners on their hind sides. By simply reversing their positions the sharpening thus produced is made available in keeping the brake in good working order.

I am aware that brake devices have been pivoted to the runners of a sled and a rock-shaft combined therewith to operate the brakes; but my manner of forming and combining brake-bars with the runners and a rock-shaft and a hand-lever to produce a compound leverage, by which the brake-bars can be moved vertically and forced down into a frozen surface, is novel and greatly advantageous.

I claim as my invention—

The compound-lever sled-brake, comprising a rock-shaft, $a$, having lateral bends $b$, the knuckles $f$, the detachable, adjustable, and self-sharpening brake-bars $d$, the arm $h$, the lever $m$, and connecting-rod $n$, constructed and combined with the bench, the runners, and the box of a sled, substantially as shown and described, to operate in the manner set forth.

JACOB R. HOIT.

Witnesses:
EMERY BEASON,
RHIONEER HOIT.